3,274,434
TIME DELAY AND DAYLIGHT INHIBITING MEANS FOR CONTROLLING AUTOMOTIVE LIGHTING SYSTEMS
Charles W. Miller, Anderson, Ind., assignor to General Motors Corporation, Detroit, Mich., a corporation of Delaware
Filed Oct. 7, 1963, Ser. No. 314,164
4 Claims. (Cl. 315—82)

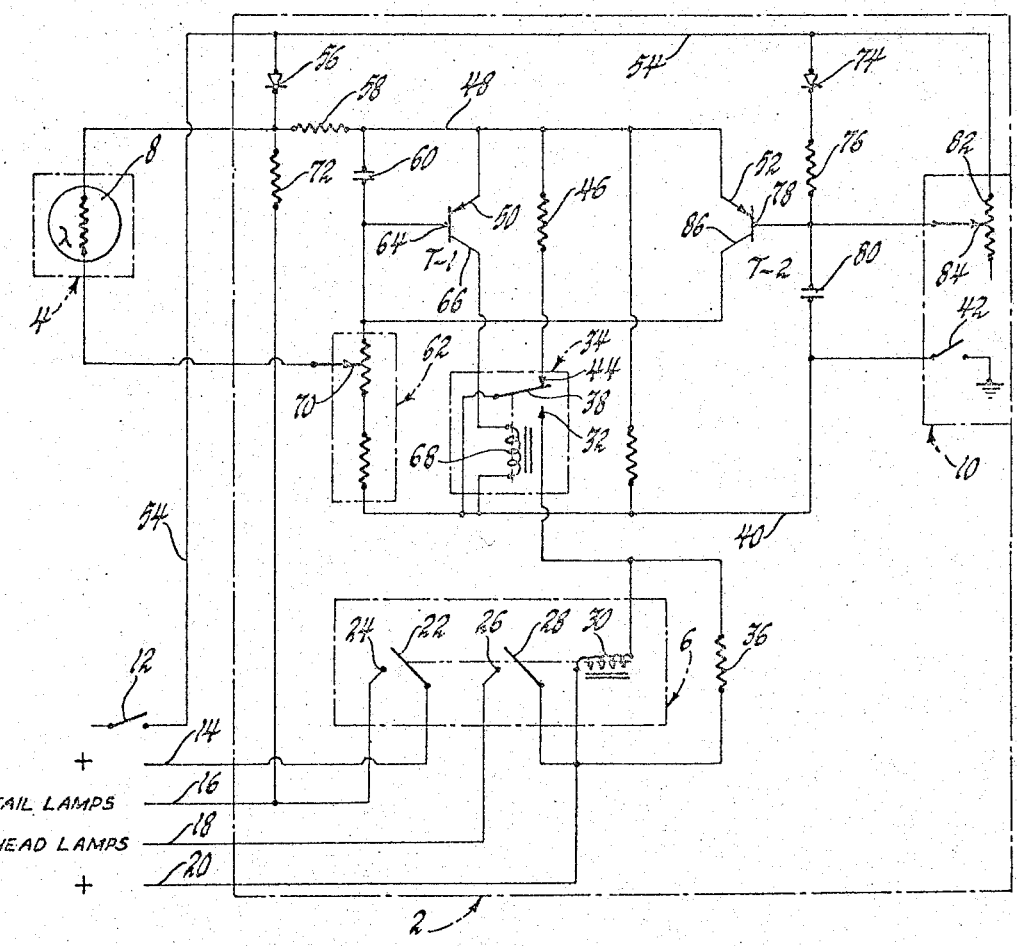

This invention relates to light sensitive control means and more particularly to light sensitive control means for automotive lighting systems which incorporates a time delay section to maintain the lighting system energized for a predetermined adjustable time period after the ignition circuit of the vehicle is switched off before the lighting system is deenergized.

Motor vehicles are normally parked for the night in darkened areas. If they are parked outside or in detached garages, it is generally inconvenient to turn off the vehicle lights and then find it necessary to locate a light switch in the garage or have inadequate light on the way to the door of the home or adjacent building.

It is, therefore, an object in making this invention to provide automatic light sensitive control means for turning on a lighting system as the ambient daylight decreases and to turn it off as the ambient daylight increases at given levels.

It is a further object in making this invention to provide automatic light sensitive control means for a lighting system which includes time delay means to prevent immediate deenergization of the lighting system upon operation or associated control circuitry.

It is a still further object in making this invention to provide light sensitive control means for the lighting system of an automotive vehicle which includes an adjustable time delay section to maintain the lighting system energized after the ignition circuit of the vehicle has been switched off.

With these and other objects in view which will become apparent as the specification proceeds, my invention will be best understood by reference to the following specification and claims and the illustrations in the accompanying drawing, in which:

The figure discloses an automatic lighting system control circuit embodying my invention.

In order to relieve the driver of an automobile of the duty of switching on the vehicle lights as darkness approaches and to switch off the car lights as the ambient daylight reaches a predetermined level, the present circuit provides light sensitive means for automatically accomplishing the normal vehicle lighting switching. If the vehicle is parked in a darkened garage with the current device applied thereto and the car started, the vehicle lights will be automatically turned on with the engine to enable the operator to safely drive the car from the darkened area but as soon as the car reaches the daylight outside the lights are switched off without any thought from the driver. If the car is being operated along a highway and a tunnel is approached, the lights are automatically switched on as the car proceeds into the tunnel and turned off as it emerges from the opposite end. Thus the driver is relieved of the duty of turning on and off his lights at various times. Assuming that the driver does not have indoor illuminated garage space and parks the car in the driveway of his home, with the present device applied, the car could be driven into the driveway in the evening after dark and the ignition switch turned off but the lights would remain on for a given period. The driver would proceed to the door of the home and at a predetermined time interval the car lights are de-energized and the system returned to normal. Thus adequate light is provided for a time to reach a given area.

The current construction includes three main sections, an amplifier 2, a light sensitive element 4, and a power relay unit 6 for switching the lights which is actually mounted within the amplifier casing. Referring now particularly to the figure, there is shown therein a light sensitive cell 8 which is incorporated in a housing shown generally at 4 and which may be mounted on top of the instrument panel so that it looks upwardly through the windshield to the sky and is affected by the amount of ambient light. Its resistance varies with the amount of light falling thereon, the resistance decreasing as the light intensity on the cell increases. The amplifier and its case may be mounted as a single unit to one side of the steering column under the instrument panel and this includes a combination switch and rheostat 10 for turning the unit on and for adjusting the length of the time delay after the ignition system has been turned off before the lighting system is de-energized. The power relay actually switches the headlamps and tail lamps on and off.

In the figure, the switch 12 illustrates the ignition switch of the car and, of course, that is connected to the battery and also to the engine ignition system. When it is closed the engine is normally running and the car in operation. Line 14 is connected to the battery source of power which would normally supply the tail lamps. Line 16 is connected to the tail lamp line and when it is energized the tail lamps are illuminated. Line 18 is connected to the headlamp line and lastly the lowest line 20 is connected to the battery source of power as indicated by +. Line 14 is connected to one movable switch armature 22 in the power relay 6, line 16 to the cooperating stationary contact 24 which is engaged by the movable armature 22 and when these two are in engagement the tail lamps are illuminated. In like manner, line 18, the headlamp line, is connected to stationary contact 26 which cooperates with movable armature 28 connected to line 20, and when these two engage the headlamps are illuminated.

Line 20 is also connected to one terminal of the operating coil 30 of the power relay, the opposite terminal of which is connected to stationary contact 32 of the sensitive control relay 34. A resistance 36 is connected in shunt across the power relay coil 30. The sensitive relay 34 includes a movable armature 38 which is pulled down when the relay is energized and when it is in its lowermost position the circuit is completed through the power relay coil 30 to ground through the ground line 40. This line is grounded when the On-Off switch 42 for this unit is closed. Armature 38 of the sensitive relay 34 also engages an upper second stationary contact 44 when de-energized. This contact is connected through resistor 46 to power supply line 48 for the emitter electrodes 50 and 52 of the transistors T–1 and T–2, respectively. Power line 48 is supplied with power from the ignition switch through line 54 and diode 56. Limiting resistor 58 is connected in series between diode 56 and line 48. Condenser 60 is connected in series with sensitivity control potentiometer 62 between power line 48 and ground line 40. A point intermediate condenser 60 and potentiometer 62 is connected directly to the base electrode 64 of transistor T–1 to control the conduction of that transistor. Collector electrode 66 of transistor T–1 is connected to one terminal of the operating coil 68 of the sensitive relay 34, the opposite terminal of which is connected to ground line 40. Thus, transistor T–1 directly controls the operation of the sensitive relay 34.

The photocell 8 is connected between one terminal of the diode 56 and the adjustable tap 70 on the sensitivity control potentiometer 62. This adjusts the light levels at which the headlamps will be switched on and off as the amount of ambient light changes. A limiting resistor 72 is connected between one end of the diode 56 and line 16 to the tail lamps for supplying voltage to the control circuit when the ignition switch is opened for purposes to be described during the time delay period.

The time delay section includes a diode 74 connected in series with resistor 76 between the main power supply line 54 and the base 78 of transistor T-2. Condenser 80 is connected between base 78 and ground line 40, and its charging and discharging provides the desired delay time. It is also connected with adjustable rheostat 82 whose adjustable arm 84 is connected to the base 78. The collector 86 of transistor T-2 is connected directly to the base 64 of transistor T-1 and its conduction will, therefore, control the bias on said base. Transistor T-2 is normally cut off and only conducts during the time delay period when the ignition switch has been turned off and before the lights are extinguished. On-Off switch 42 and adjustable tap 84 for changing the time delay period are both operated by a single shaft in the combined switch and rheostat 10, switch 42 being operated by reciprocal movement of the shaft and rheostat 84 by a turning thereof.

The operation of the circuit will now be described.

Assuming that the driver or operator has closed switch 42 to incorporate the automatic control and also that ignition switch 12 is closed and the car is operating. The light sensitive system is in general energized. The position of the armatures of both the sensitive relay 34 and the power relay 6 are those assumed during daylight conditions where there is a sufficient amount of illumination on the photocell 8 to indicate daylight and no necessity for lighting system energization. At this time voltage is applied to line 54 through the ignition switch 12 and through diodes 56 and 74 to power line 48 and the time delay system, respectively. At this time, voltage on the photocell and that on line 54 is substantially the same and resistor 58 furnishes voltage to the emitters 50 and 52 of transistors T-1 and T-2. The bias on base 64 of transistor T-1 is sufficiently low to cause the sensitive relay 68 to be de-energized, allowing its armature to be held up in the position shown and power relay 6 will, therefore, be de-energized and the vehicle lighting circuit opened. At this time also resistor 72 connects the power lines to the tail lights through line 16 but due to the relatively high resistance there is insufficient current flow to cause the same to glow. As previously mentioned, voltage is also applied to the base of transistor T-2. The capacitor 80 will charge up to the potential of line 54 through diode 74 and this occurs rapidly. Resistor 76 limits the current flow through this diode. If it were not for this diode capacitor 80 would charge through resistance 82 and its setting would determine the amount of time it would take for the capacitor to become charged. With capacitor 80 charged approximately to the potential of line 54 the base 78 of transistor T-2 is at a higher potential than its emitter 52 and this transistor is non-conductive or cut off.

When the ambient light level on photocell 8 decreases to a particular point the resistance of this cell increases and current through the potentiometer 70 is reduced to a point changing the base bias on transistor T-1 so there is sufficient current flowing through that transistor and the sensitive relay coil 68 to cause it to pull on its armature 38 engaging point 32. This completes the energizing circuit for operating coil 30 of the power relay 6 which now closes its armatures causing them to engage their stationary contacts and the tail and headlights are energized. Upon an increase in ambient illumination, of course, the current is gradually cut down through transistor T-1, sensitive relay 34 opens and the lights are switched off.

Up to this point there is no change in the conductivity of transistor T-2 which has remained cut off from the time of original energization and charging of condenser 80. Assuming that the car is being operated at night and that the driver reaches the terminus, parks his car in a dark area and turns off the ignition switch, line 54 immediately drops from battery voltage to ground potential due to the various components in the car which are grounded. The car lighting system, however, remains energized. The lights now receive power through line 14, armature 22, stationary contact 24, resistor 72 which now applies the battery potential to power line 48 and maintains transistors T-1 and T-2 energized. However, the charge on capacitor 80 may now leak off through adjustable rheostat 82 to ground line 54. This causes the voltage on base 78 of transitsor T-2 to approach ground and this enables transistor T-2 to conduct. Current flow through transistor T-2 also flows through sensitivity control potentiometer 62 and this raises the base potential of base 64 of transistor T-1 to cause that transistor to cut off releasing armature 38 to its open position and thus de-energizing the power relay 6 to cut off the lights. The setting on point 84 on rheostat 82 determines the time delay period during which condenser 80 may discharge and, therefore, the time that the lights remain on after the ignition switch has been turned off. It is desired to emphasize that transistor T-2 is non-conducting during practically all of the operation of the car except those few moments when the time delay is operating. Further, there is no need to reset any controls for at the end of the time delay period the complete system returns to its initial de-energized condition and is ready to start again to provide automatic control. All ground circuits are also connected through the manual On-Off switch 42 and, therefore, the entire system is turned off so that malfunctions will not keep the headlights on.

This system can be used either with the normal manual headlight switch or in conjunction with automatic headlamp dimmer systems which makes the full operation of the headlights of a car completely automatic.

What is claimed is:

1. In a control system, a source of electrical power, a load circuit, a main relay switching means interconnecting the source of electrical power and the load to control energized periods thereof, a control circuit connected to the main relay switching means to control the same including light sensitive means, a control relay connected to said main relay switching means to control the same, a transistor having a base, emitter and collector electrodes, biasing means connected to said base and emitter electrodes and to the source of electrical power to provide proper operating voltages therefor, said light sensitive means being connected to the base electrode biasing means to vary the bias thereon with ambient light changes, said collector electrode being connected to said control relay means so that conduction of the transistor controls the energization of the control relay and in turn the main relay switching means to energize and de-energize the load circuit dependent upon changes in ambient light on the light sensitive means, a second transistor having an input and an output circuit, said output circuit being connected to the source of electrical power and to the base biasing means for the first transistor, time delay means connected to the input circuit for the second transistor and to the source of electrical power to change the bias on the input circuit when voltage is removed from the input connection to cause the second transistor to become conductive after a predetermined time and alter the base bias on the first transistor to reduce conduction therethrough and de-energize the control relay.

2. In a control system, a source of electrical power, a load circuit, a main relay switching means interconnecting the source of electrical power and the load circuit to control energized periods thereof, a control circuit connected to the main relay switching means to control the same including light sensitive means, a control relay connected to said main relay switching means to control the same, a first and a second transistor having input and output circuits, biasing means connected to both first and second transistors and to the source of electrical power to provide operating voltages therefor, said light sensitive means being connected to the input circuit of the first transistor and the control relay connected in the output circuit of said first transistor so that changes in incident light on the light sensitive means will cause a variation in conduction through the first transistor and operate the control relay, a time delay circuit connected to the input circuit of the second transistor, said output circuit of said second transistor being connected to the input circuit of the first transistor so that changes in conductivity of the second transistor will control the bias on the first transistor and cause it to become non-conductive under desired circumstances, and switching means to disconnect the source of electrical power from the time delay circuit so that it may discharge to cause the second transistor to conduct and cut off the first transistor at a predetermined time period.

3. In an automotive vehicle having a source of electrical energy, an ignition system for an internal combustion engine and an electrical lighting system, an ignition switch connected between the source of electrical energy and the ignition system, a main relay switching means connected to the source of electrical energy and the electrical lighting system, first and second transistors each having an input and an output circuit, biasing means connected to said transistors and to the ignition switch and to the lighting system to provide the proper operating bias, light sensitive means connected to the input circuit of the first transistor, said bias means for said first transistor being adjustable so that it may be adjusted to make the transistor conductive below a certain ambient light level and non-conductive above said level, a sensitive control relay in the output circuit of the first transistor connected to the main relay switching means to turn the lighting system on and off, said biasing means for said second transistor being of such value that it is normally non-conductive and the output circuit of said second transistor being connected to the input circuit of the first transistor so that conductance of the second transistor will vary the bias of the first, time delay means connected to the input of the second transistor including a condenser connected to the ignition switch which discharges when the ignition switch is open to cause the bias on the second transistor to change so that it becomes conductive while the first transistor is still conducting and supplied with power through the connection to the lighting system, said conduction of the second transistor changing the bias on the first transistor and causing it to cut off to de-energize the main relay switching means.

4. In an automotive vehicle having a source of electrical energy, an ignition system for an internal combustion engine and an electrical lighting system, an ignition switch connected between the source of electrical energy and the ignition system, a main relay switching means connected to the source of electrical energy and the electrical lighting system, a light sensitive control system connected to the source of electrical energy and to the main relay switching means to turn the lighting system on in the absence of light and off in the presence, and time delay means in the light sensitive control system to maintain the lighting system energized in the absence of light for a predetermined time period after the ignition switch is turned off, said time delay system including a condenser connected to the ignition switch and charged by the normal voltage thereof, a transistor, biasing means for said transistor connected to said ignition switch and also to the lighting system and supplied with voltage by both so disposed as to be normally non-conductive, variable resistance means connected between the condenser and the ignition switch through which the condenser may discharge when the ignition switch is opened and that connection grounded to provide a time delay and change the bias on the transistor so that it conducts to open the main relay switching means.

No reference cited.

JAMES W. LAWRENCE, *Primary Examiner.*

C. R. CAMPBELL, *Assistant Examiner.*